May 20, 1930.  L. D. SOUBIER  1,759,209
GLASS FEEDER
Filed Oct. 26, 1927
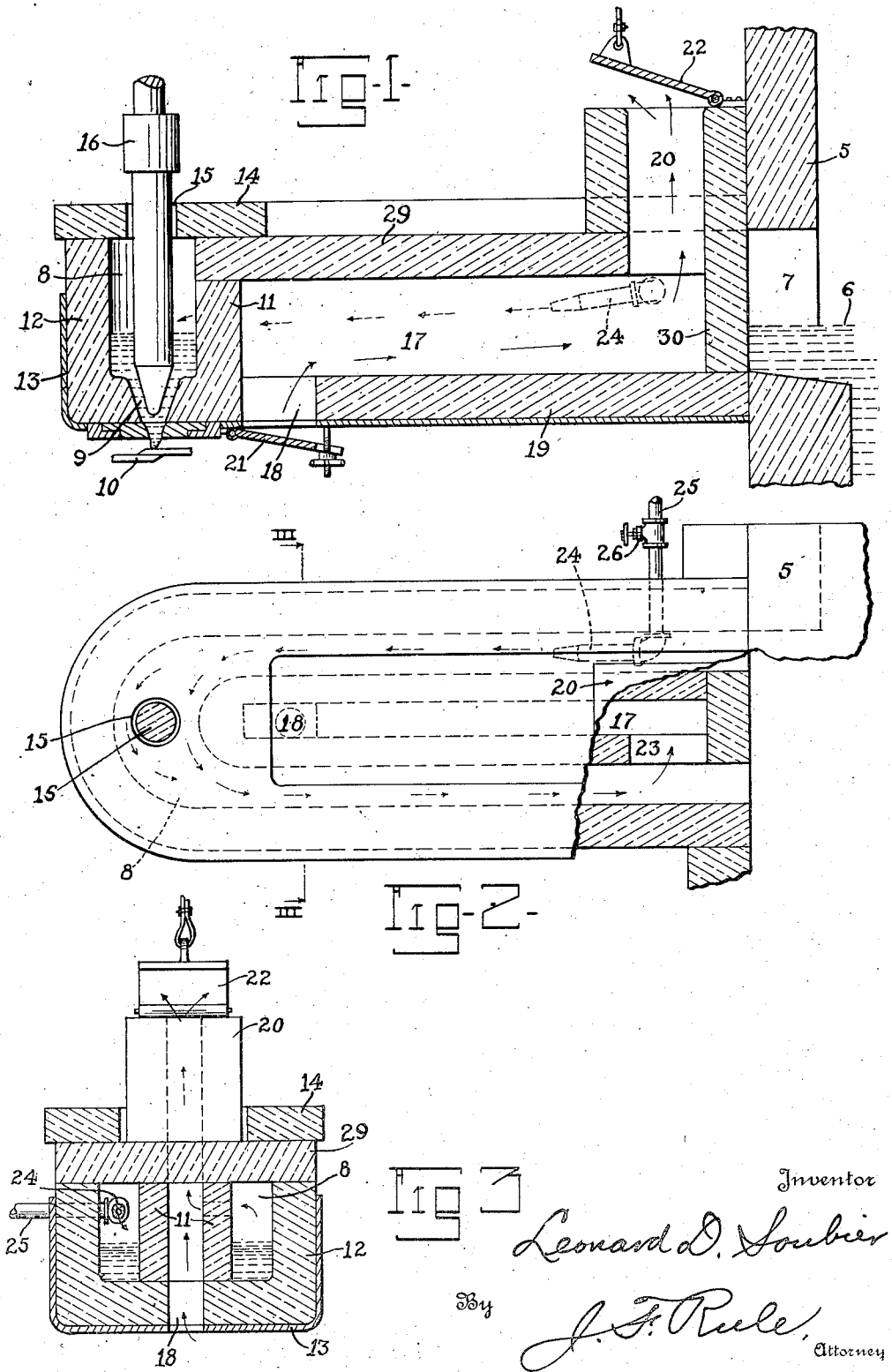
Inventor
Leonard D. Soubier
By
J. F. Rule,
Attorney Patented May 20, 1930

1,759,209

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

GLASS FEEDER

Application filed October 26, 1927. Serial No. 228,735.

The present invention relates to improvements in glass feeders and particularly to that type of feeder comprising a lateral tank or furnace extension having a bottom outlet opening through which molten glass issues and is later severed to form individual charges for delivery to ware forming molds.

An object of the present invention is to provide means for maintaining uniformity of temperature and viscosity throughout the glass issuing from the feeder. Thus, the ware formed from such glass is less subject to strains and other imperfections than ware formed from glass having cold streaks or the like therein.

Another object is to provide a feeder in which relatively shallow supply streams of glass flow to a delivery opening and means to apply heat directly to these streams. Thus, the temperature and viscosity of the issuing glass may be maintained uniform throughout with comparative ease.

A further object is to provide a substantially U-shaped channel through which glass flows to the outlet opening from the main supply body, and means for equalizing the temperature and viscosity of the glass along both sides of the stream flowing to the outlet. To this end, there is provided a heating device which causes passage of heat in one direction over the glass in the U-shaped trough, and a chamber between the branches of the trough through which outside air is permitted to flow to maintain the temperature of the inner wall of the trough at substantially the same degree as that of the outer wall.

A further object is to provide a single draft control which regulates the projection of a flame over the glass in the feeder trough and assists in controlling the passage of outside air over the inner walls of the feeder trough.

Other objects will be apparent hereinafter.

In the accompanying drawings:

Fig. 1 is a vertical central sectional view of the feeder.

Fig. 2 is a plan view thereof with parts in section.

Fig. 3 is a sectional view taken substantially along the line III—III of Fig. 2.

In the preferred embodiment of the invention, the tank or furnace 5 containing the supply body 6 of molten glass is formed with an outlet 7 providing communication between the interior of the tank and the lateral extension or boot which comprises the feeder. This boot is formed with a substantially U-shaped trough 8 opening at both ends into the furnace and provided at the forward extremity with a bottom outlet orifice 9 through which molten glass issues in a stream and is periodically severed by the shears 10 or the like into formed charges for delivery to ware forming molds (not shown). This trough comprises inner and outer walls 11 and 12, respectively, formed of suitable refractory material and supported in a frame 13. A cover block 14 closes the upper side of the trough 8, the forward end portion of said cover being provided with a vertical opening 15 through which the flow regulating plunger 16 extends for projection into the glass over the outlet 9. Through the reciprocation of this plunger, the discharge of glass through said outlet is alternately accelerated and retarded in timed relation to movement of ware forming molds to a station below said orifice.

The inner walls 11 of the trough 8 are spaced apart (Figs. 2 and 3) providing an elongated relatively narrow chamber 17 which communicates through an opening 18 in the bottom wall 19 with the atmosphere, and at its other end opens into a stack 20 (Fig. 1) rising from the inner end of the boot. A refractory block 29 forms the upper wall of the chamber 17, the inner end of the latter being closed by a refractory block 30. An adjustable damper 21 is hinged to the supporting frame 13 to control the effectiveness of the bottom opening 18 by way of which outside air enters the chamber 17, as will be apparent. The stack 20 is equipped with a damper 22 which is adjustable to control the draft and thereby regulate the rate of movement of heat over the surface of the glass in the trough 8. At a point in proximity to the lower end of the stack 20, one of the inner walls 11 of the trough is formed with an opening 23 above the glass level providing for exhaust of products of combustion or spent heat from the trough 8 to said chamber 17 and thence through the stack 20 to the atmosphere.

The glass in the trough may be heated by a burner 24 located at one end of said trough and connected to a fuel supply pipe 25. A valve 26 controls flow of fuel to the burner 24.

In the operation of a feeder constructed as above set forth, the glass flows from the supply body 6 through both branches of the feeder trough to the bottom outlet opening 9 where its issuance through the outlet is alternately accelerated and retarded by the plunger 16. Because of the arrangement of the burner 24 at one end of the trough 8, the heat will be distributed over substantially the entire surface of the glass in the trough, such distribution being due to the relation between said burner and the exhaust opening 23 through which products of combustion or spent heat may be exhausted to the stack 20. By adjusting the damper 22 on the stack 20, the rate of movement of the heat over the glass in the trough may be varied as required by the particular operating conditions. By providing the central chamber 17 with a bottom inlet opening 18, fresh outside air may be drawn into said chamber to lower the temperature of the wall 11 and then exhausted through the stack 20 with the products of combustion to the atmosphere. This injection of outside air into the chamber 17 where it comes in contact with the inner walls 11 of the trough, tends to equalize the temperature of the inner and outer walls of said trough. Such equalization of the temperature of these walls, directly influences the temperature of the glass in the trough so that the former is maintained at more uniform temperature and viscosity than it would be if the central chamber 17 were eliminated. The provision of a substantially U-shaped trough through which the molten glass flows to the outlet orifice 9, permits maintenance of a relatively shallow stream of glass in each branch of the trough. Thus, heat applied to the glass in the feeder is quite effective and may be utilized to maintain the glass at an exceptionally uniform temperature, and moreover, the temperature may be readily controlled and varied as required by the ware being produced.

Modifications may be resorted to within the spirit and scope of the appended claims.

What I claim is:

1. In combination, a container for a supply body of molten glass, a laterally extending substantially U-shaped trough communicating at both ends with the container and having a bottom outlet opening therein, a cover for said trough, a chamber arranged between the branches of said trough and having a bottom inlet at its forward end for entry of outside air, a stack rising from the inner end of said chamber, an exhaust port providing communication between said stack and one end of the trough, and means arranged at the other end of said trough to apply heat to the glass in the trough.

2. In combination, a container for a supply body of molten glass, a laterally extending substantially U-shaped trough communicating at both ends with the container and having a bottom outlet opening therein, a cover for said trough, a chamber arranged between the branches of said trough and having a bottom inlet at its forward end for entry of outside air, a stack rising from the inner end of said chamber, an exhaust port providing communication between said stack and one end of the trough, means arranged at the other end of said trough to apply heat to the glass in the trough, and means to control the effectiveness of the applied heat.

3. In combination, a container for a supply body of molten glass, a laterally extending substantially U-shaped trough communicating at both ends with the container and having a bottom outlet opening therein, a cover for said trough, a chamber arranged between the branches of said trough and having a bottom inlet at its forward end for entry of outside air, a stack rising from the inner end of said chamber, an exhaust port providing communication between said stack and one end of the trough, means arranged at the other end of said trough to apply heat to the glass in the trough, and a damper on said stack to regulate the rate of movement of heat over the glass in said trough.

4. In combination, a container for a supply body of molten glass, a laterally extending substantially U-shaped trough communicating at both ends with the container and having a bottom outlet opening therein, a cover for said trough, a chamber arranged between the branches of said trough and having a bottom inlet at its forward end for entry of outside air, a stack rising from the inner end of said chamber, an exhaust port providing communication between said stack and one end of the trough, means arranged at the other end of said trough to apply heat to the glass in the trough, means to control the effectiveness of the applied heat, and adjustable means to control admission of air into said chamber.

5. In combination, a container for a supply body of molten glass, a laterally extending substantially U-shaped trough communicating at both ends with the container and having a bottom outlet opening therein, a cover for said trough, a chamber arranged between the branches of said trough and having a bottom inlet at its forward end for entry of outside air, a stack rising from the inner end of said chamber, an exhaust port providing communication between said stack and one end of the trough, means arranged at the other end of said trough to apply heat to the glass in the trough, a damper on said stack to regulate the rate of movement of heat over the glass in said trough, and an adjustable damper for the bottom inlet opening to control the entry of air into said chamber.

6. In combination, a container for a supply body of molten glass, a substantially U-shaped trough communicating at both ends with the interior of said container and having a bottom outlet opening, a chamber between the branches of said trough, means to cause circulation of outside air through said chamber, means to apply heat to glass in said trough, and means to exhaust the heat from one end of the trough to the atmosphere by way of said chamber.

7. In combination, a container for a supply body of molten glass, a substantially U-shaped trough communicating at both ends with the interior of said container and having a bottom outlet opening, a chamber between the branches of said trough, means to cause circulation of outside air through said chamber, means to apply heat to glass in said trough, means to exhaust the heat from one end of the trough to the atmosphere by way of said chamber, and a stack rising from and communicating with the interior of said chamber to conduct cooling air and spent heat therefrom to the atmosphere.

8. In combination, a container for a supply body of molten glass, a substantially U-shaped trough communicating at both ends with the interior of said container and having a bottom outlet opening, a chamber between the branches of said trough, means to cause circulation of outside air through said chamber, means to apply heat to glass in said trough, means to exhaust the heat from one end of the trough to the atmosphere by way of said chamber, a stack rising from and communicating with the interior of said chamber to conduct cooling air and spent heat therefrom to the atmosphere, and means to vary the rate of exhaust of said air and spent heat through said stack.

9. In combination, a container for a supply body of molten glass, a substantially U-shaped trough communicating at both ends with the interior of said container and having an opening thru which glass may be removed from the trough, a chamber between the branches of said trough, means to cause circulation of outside air thru said chamber, means to apply heat to glass in said trough, and means to exhaust the heat from one end of the trough to the atmosphere by way of said chamber.

Signed at Toledo, in the county of Lucas and State of Ohio, this 24th day of October, 1927.

LEONARD D. SOUBIER.